US005815174A

United States Patent [19]

Stone

[11] Patent Number: 5,815,174

[45] Date of Patent: Sep. 29, 1998

[54] SYSTEM AND METHOD OF THERMALLY VERIFYING FRESHLY PRINTED IMAGES

[75] Inventor: J. James Stone, Northbrook, Ill.

[73] Assignee: Videojet Systems International, Inc., Wood Dale, Ill.

[21] Appl. No.: 588,995

[22] Filed: Jan. 19, 1996

[51] Int. Cl.[6] .......................... B41J 29/393; B41J 2/015; H04N 1/00

[52] U.S. Cl. .............................. 347/19; 347/98; 382/135; 358/406

[58] Field of Search ................................. 347/17, 19, 98; 283/72; 382/135, 137; 434/110; 358/406, 296, 462; 106/31.14; 250/316.1

[56] References Cited

U.S. PATENT DOCUMENTS

| | | | |
|---|---|---|---|
| 3,916,194 | 10/1975 | Novak et al. | 250/338.1 |
| 4,864,618 | 9/1989 | Wright et al. | 380/51 |
| 4,893,558 | 1/1990 | Gouch | 101/211 |
| 5,521,722 | 5/1996 | Colville et al. | 358/500 |
| 5,547,501 | 8/1996 | Maryuama et al. | 106/21 R |

*Primary Examiner*—Peter S. Wong
*Assistant Examiner*—Bao Q. Vu
*Attorney, Agent, or Firm*—Leydig, Voit & Mayer, Ltd.

[57] ABSTRACT

A system and method for detecting a latent image formed with an invisible ink. A mechanism, such as a heater for heating the ink, provides a temperature differential between the ink and the substrate. An ink delivery system such as an ink jet printer applies the ink to the substrate to form a latent image thereon. A heat-sensitive scanning device scans the substrate and outputs an electrical signal corresponding to the temperature differential between the ink and the substrate before the ink reaches thermal equilibrium with the substrate. The electrical signal includes information representative of the image on the substrate, and may be displayed, recorded and/or processed as desired to verify the image.

20 Claims, 2 Drawing Sheets

SYSTEM AND METHOD OF THERMALLY VERIFYING FRESHLY PRINTED IMAGES

TECHNICAL FIELD OF THE INVENTION

The present invention relates generally to the printing of images, and more particularly to security printing with inks arranged to produce latent images.

BACKGROUND OF THE INVENTION

Many commercial applications benefit from the printing of latent, or "secure" images on a product, wherein the latent image may only be revealed by subjecting the product to a subsequent process of image activation. By way of example, invisible inks enable lot numbers or the like to be marked on products for identification thereof without marring the attractiveness of the products. Similarly, other products may be marked with codes that are not intended to be viewed by the purchasing public, such as covert codes for verifying the authenticity of goods which are capable of being counterfeited.

U.S. Pat. No. 5,395,432, assigned to Videojet Systems International, Inc., Wood Dale Ill., provides a latent image ink capable of use with an ink jet printing system which utilizes zinc-chloride as a latent image forming agent. Ink jet printing is a well-known technique by which printing is accomplished without contact between the printing device and the substrate on which the image is deposited.

Ink jet printing is a non-impact technique for projecting droplets of ink onto a substrate in a desired pattern. There are two major categories of ink jet printing, known as "Drop-On-Demand" ink jet or "Continuous" ink jet. With Drop-On-Demand ink jet technology, the ink is normally stored in a reservoir and delivered to a nozzle in the print head of the printer. A means exists to force a single drop of ink out of the nozzle whenever it is needed to print a single spot on the printed medium (for example, paper). For Continuous ink jet, a conductive ink is supplied under pressure to an ink nozzle and forced out through a small orifice, typically 35 to 120 $\mu$m in diameter. Prior to passing out of the nozzle, the previously unbroken, pressurized ink stream proceeds through a ceramic crystal which is subjected to an alternating electric current. This current causes a piezoelectric vibration in the crystal corresponding to the frequency of the alternating electric current. This vibration, in turn, breaks the continuous stream into a continuous series of ink droplets which are equally spaced and of equal size. Surrounding the jet, at the point where the drops separate from the liquid stream, is a charge electrode. A predetermined voltage is applied between the charge electrode and the drop stream, such that when the drops break off from the stream, each drop carries a charge proportional to the applied voltage at the instant at which it breaks off. The drops pass between two deflector plates which are maintained at a constant potential, typically ±2.5 kV. In the presence of this field, each drop is deflected towards one of the plates by an amount proportional to the charge it is carrying. Drops which are uncharged are undeflected and collected into a gutter to be recycled to the ink nozzle. Those drops which are charged, and hence deflected, impinge on a substrate traveling at right angles, e.g., horizontally, to the direction of drop deflection, e.g., vertically. Thus, by varying the charge on individual drops, a desired vertical pattern can be printed, which is synchronized with the horizontal substrate movement to produce a two-dimensional, dot-matrix image.

The ink jet process is adaptable to computer control for high speed printing of continuously variable data. As can be appreciated, the capability of computer control and the high printing speeds thus make ink jet printers particularly valuable delivery systems in commercial applications.

While invisible inks, particularly in combination with ink jet printing, thus provide substantial benefits to commercial and other applications, practical problems arise with their use. In particular, since these inks are invisible, even during printing operations, visual verification of the images cannot be performed without subsequent activation, such as by application of a chemical to the substrate. Nevertheless, if it is desired to write coded information onto a substrate, it is generally necessary to ensure that the correct coding information is being written. As a result, it becomes necessary to activate the latent images on sample quantities of the printed substrates, and thus special facilities for applying the activation chemical must be provided. Moreover, such testing destroys the latency of the image, effectively consuming the sample products and causing gaps in numbering schemes when attempting serialized encoding. In short, known types of image verification schemes constitute separate manufacturing steps which consume costly resources and cause other problems.

OBJECTS AND SUMMARY OF THE INVENTION

Accordingly, it is an object of the present invention to provide a system and method for verifying latent images upon application of the images to substrates.

In accomplishing that object, another object of the invention is to provide such a system and method that verifies the image in a manner that does not compromise the security features provided by the ink.

Another object of the present invention is to provide a system and method as characterized above that operates without requiring activation of the ink to detect the latent image.

It is a related object to provide a system and method of the above kind that allows the latent image to be detected without destroying the substrate and/or the latency of the image.

Briefly, the present invention provides a system and method for detecting a latent image formed with an invisible ink, including a temperature controller for providing a temperature differential between the ink and the substrate, such as a heater for heating the ink. An ink delivery system such as an ink jet printer applies the ink to the substrate to form a latent image thereon. A heat-sensitive scanning device scans the substrate and outputs an electrical signal corresponding to the temperature differential between the ink and the substrate before the ink reaches thermal equilibrium with the substrate. The electrical signal includes information representative of the image on the substrate, and may be displayed, recorded and/or processed as desired to verify the image.

Other objects and advantages will become apparent from the following detailed description when taken in conjunction with the drawings, in which:

DETAILED DESCRIPTION OF THE PREFERRED EMBODIMENT

Figure 1:
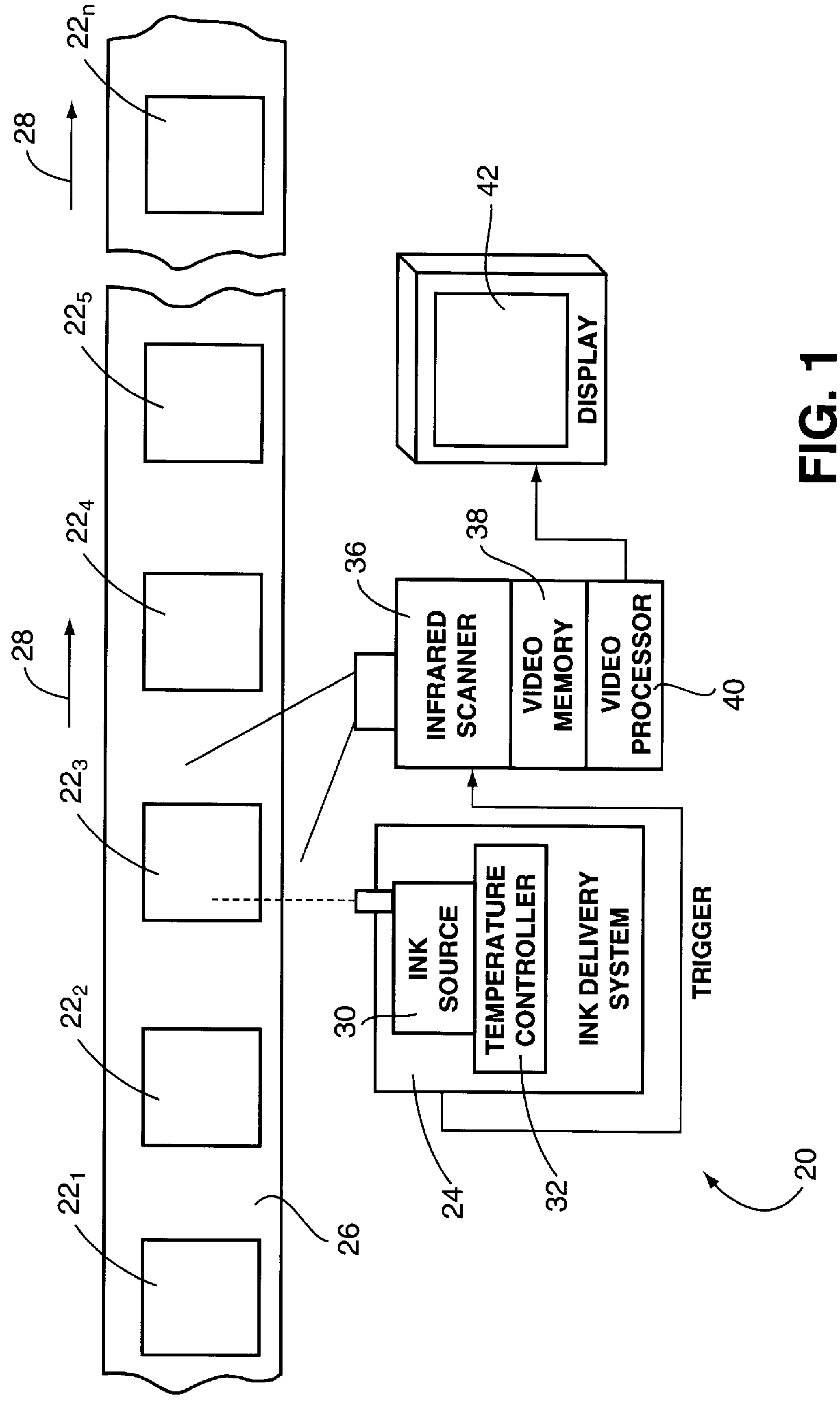
FIG. 1 is a block diagram of a system suitable for implementing the invention.
Figure 2:
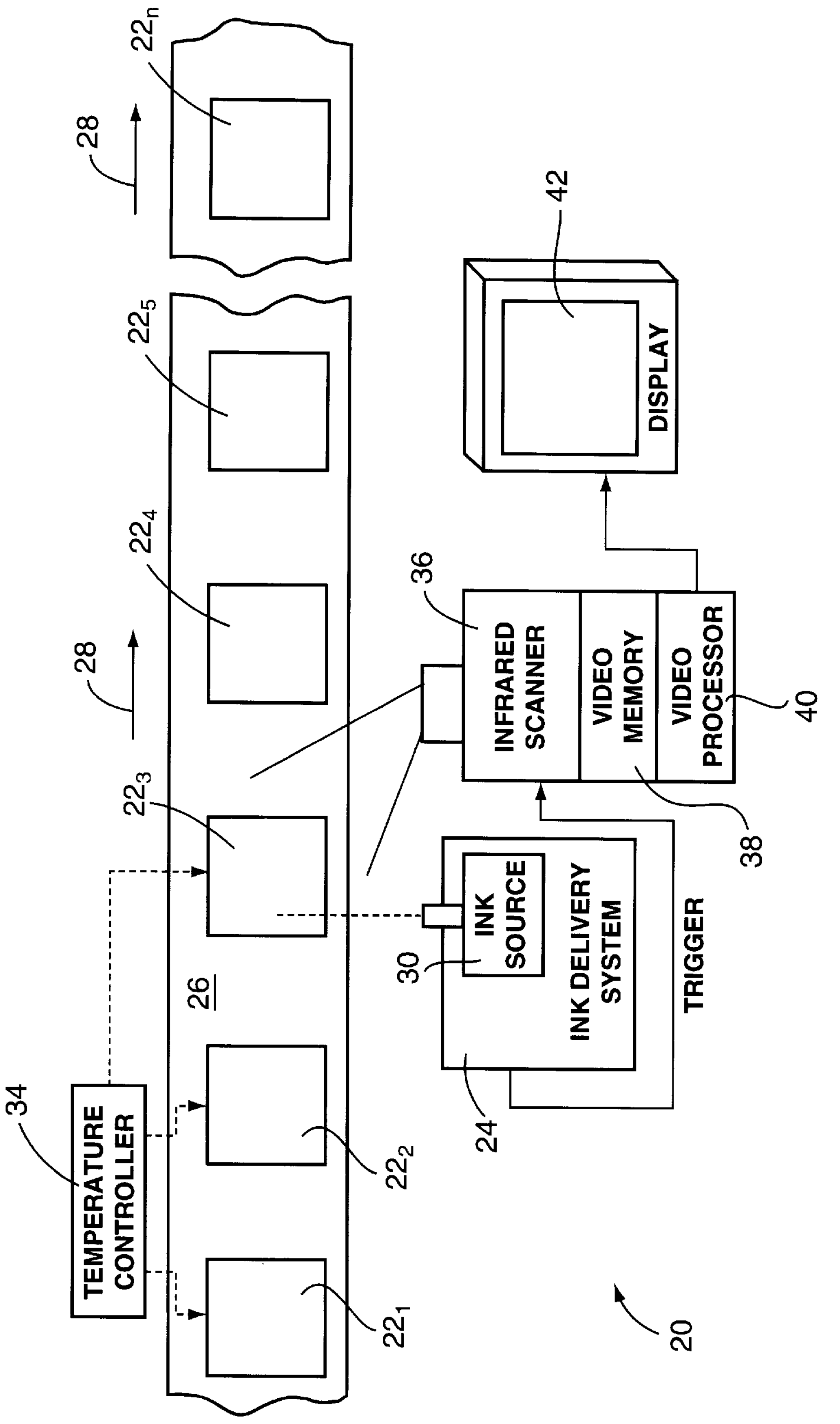
FIG. 2 is a block diagram of an alternative system suitable for implementing the invention.

Turning to FIGS. 1 and 2 of the drawings, there is shown a verification system 20 constructed in accordance with the present invention. A plurality of substrates $22_1$–$22_n$ are moved with respect to an ink delivery system 24, such as by arranging the substrates $22_1$–$22_n$ on a conveyor 26. As shown, the conveyor 26 is moving from left to right as indicated by directional arrows 28.

The ink delivery system 24 is preferably an ink jet printer arranged to print images in a dot-matrix pattern. To this end, the ink delivery system 24 is coupled to a source of latent ink 30. Commercially available ink jet imagers desirable for use with the present invention are manufactured by Videojet Systems International, Inc., Wood Dale, Ill., including Model Nos. SR 25B and SR 50B. Suitable latent inks for use with the present invention are also available from Videojet Systems International, Inc., and have been assigned the interim designations of Q63448 and Q63449. These inks are described in the aforementioned U.S. Pat. No. 5,395,432, the disclosure of which is hereby incorporated by reference. As can be appreciated, however, other latent inks and printing mechanisms, including impact printers and printing press-type systems, may be used with the system and method of the present invention.

As with conventional ink jet systems, printing of the image is ordinarily synchronized with movement of the substrates $22_1$–$22_n$. For example, the conveyor 26 may be equipped with an encoder or the like to provide pulses at a frequency corresponding to the belt speed. Alternatively, or in addition to the encoder pulses, the substrates $22_1$–$22_n$ may be arranged to appropriately trigger a sensor (such as by contacting a microswitch or by interrupting an optical source and sensor combination) to inform the ink delivery system 24 when a given substrate is in position to begin receiving an image.

In accordance with one aspect of the present invention, there is provided a means for providing a temperature differential between the latent ink in the source of ink 30 and the substrates, (i.e., at least the substrate $22_3$ being printed). As shown in FIG. 1, this may include an ink temperature controller 32 thermally coupled by convection or conduction to the source of ink 30 for controllably increasing or decreasing the temperature of the ink. Preferably, the ink temperature controller 32 comprises a heater, but it may alternatively comprise a cooling mechanism.

Alternatively, a temperature controller 34 may increase or decrease the temperature of at least the substrates to be printed, e.g., substrates $22_1$–$22_3$, with respect to the temperature of the ink as shown in FIG. 2. Of course, if desired, both the substrate and the ink source may be provided with individual temperature controllers, such as to ensure that the substrate is below and the ink above the ambient room temperature (or vice-versa).

Regardless of whether the ink and/or substrate is heated or cooled with respect to one another, a temperature differential exists therebetween for a time after the ink is applied to the substrate. What constitutes a suitable temperature differential depends on a number of factors, as described in more detail below.

In accordance with another aspect of the present invention, a heat-sensitive scanner of images such as an infrared scanner 36 detects the temperature differential between the applied ink and the substrate before the two reach thermal equilibrium with one another. The scanner 36 converts the heat differential to an electrical video signal which can be recorded, processed and/or displayed as desired. As can be appreciated, the thermal contrast between the drops of ink and the substrate produces an image in the same pattern as the applied ink drops and thus the image detected by the scanner is that of the image deposited on the substrate.

An infrared scanner 36 deemed suitable for use with the present invention is commercially available from Texas Instruments Corp., and is identified by the name NIGHT-SIGHT™. This camera has been proven capable of being focused to fields as close as three feet, while providing an image resolution of 328 by 200 pixels, suitable for use with ink jet printing. This camera provides RS-170 video output, and is thus compatible with standard video systems. Of course, other scanners capable of detecting the temperature differences between the ink and the substrate being scanned will suffice for purposes of the present invention. For example, a higher resolution imaging system that also provides standard video output is commercially available from David Sarnoff Research Center, Princeton, N.J., Model No. IRC640.

As can be appreciated, a number of factors influence the ability to thermally verify a latent image, including the temperature differential, the type of ink and substrate material, the sensitivity of the scanner 36, and for how long the ink resides on the material before the image is scanned. For example, a metal substrate will ordinarily reach thermal equilibrium with an ink more quickly than a paper substrate, and consequently only a short time is available to scan the image before even a highly-sensitive infrared sensor is no longer able to distinguish a heat differential.

However, it should be noted that the entire image need not be scanned as a whole in order to be verified. For example, it is possible that certain ink drops will reach thermal equilibrium with a substrate before the entire image has been applied to the substrate. By storing frames of information over a period of time, such as in a video memory 38, a video processor 40 can combine the partial images formed by various drops into a complete image. Thus, if a lengthy image is being printed, it is likely that the initially printed portion will reach thermal equilibrium with the substrate before the final portion has been printed. However, the video processor 40 which, using known techniques, generates a composite image by rebuilding a number of frames or "snapshots" of individual images stored in the memory 38. For example, the scanner 36 may be triggered to obtain a frame of information with each drop or row of drops being dispensed. Indeed, as long as the sampling rate of the scanner 36 is sufficiently fast, a complete image may be reconstructed and viewed in this manner even though the image was not detectable in a single time frame. Accordingly, as used herein, the electrical representation of the image may be considered either a single scanned image or a number of combined images. A display 42 may be connected to receive the rebuilt image from the video processor 40. Of course if video processing is not required, the display 42 may be directly connected to the infrared scanner 36 or the video memory 38, which, for example, may comprise a videocassette recorder.

As can be appreciated, latent images are particularly valuable with items which are often counterfeited, including tickets to sporting or other entertainment events, lottery tickets, currency and so on. The present invention provides a system and method to verify all latent images, not just sample quantities, and without interrupting sequential printing operations. Because a video signal is produced, verification may be performed with an automated vision system or the like, such as within the video processor 40, thereby eliminating the need for manual verification. In addition, the video signal may be recorded and preserved as long as desired such as to provide evidence that items were indeed properly marked with a latent image. To this end, a the video memory 38 may comprise a video recorder or other nonvolatile storage device connected to the standardized output of the scanner 36.

As can be seen from the foregoing detailed description, there has been provided a system and method for verifying a latent image upon application of the image to a substrate. The image is verified in a manner that does not compromise the security features provided by the ink, and operates without requiring activation of the ink to detect the latent image. The above system and method allows the latent image to be detected without destroying the substrate and/or the latency of the image.

What is claimed is:

1. A method of detecting a latent image on a substrate formed with an invisible ink by sensing temperature variations in a scanned field of view, the method comprising the steps of, providing a temperature differential between the invisible ink and the substrate, applying, after the providing step, a quantity of the invisible ink to the substrate to form the latent image thereon, scanning the substrate with a heat-sensitive scanner before the applied ink reaches thermal equilibrium with the substrate, and outputting an electrical signal from the heat-sensitive scanner, the electrical signal having information therein representative of the image formed by the ink on the substrate.

2. The method of claim 1 further comprising the steps of displaying the electrical signal as a visible image.

3. The method of claim 1 further comprising the step of storing the image information in the electrical signal in a video memory.

4. The method of claim 3 further comprising the step of processing the electrical signal to create a composite image from the image information therein and the image information stored in the video memory.

5. The method of claim 1 further comprising the step of processing the electrical signal to evaluate the image information therein.

6. The method of claim 1 wherein the step of providing the temperature differential between the invisible ink and the substrate comprises the step of heating the ink.

7. The method of claim 1 wherein the step of providing the temperature differential between the invisible ink and the substrate comprises the step of heating the substrate.

8. The method of claim 1 wherein the step of providing the temperature differential between the invisible ink and the substrate comprises the step of cooling the ink.

9. The method of claim 1 wherein the step of providing the temperature differential between the invisible ink and the substrate comprises the step of cooling the substrate.

10. A system for detecting an image formed on a substrate with an invisible ink by sensing temperature variations in a scanned field of view containing the invisible ink and the substrate, comprising, a temperature controller for providing a temperature differential between the ink and the substrate, an ink delivery system for applying the ink to the substrate to form an image thereon, a heat-sensitive scanning device for scanning the substrate and applied ink and outputting an electrical signal corresponding to a temperature image of the scanned applied ink and the substrate.

11. The system of claim 10 wherein the heat-sensitive scanning device comprises an infrared camera.

12. The system of claim 10 wherein the ink delivery system comprises an ink jet printer.

13. The system of claim 10 wherein the temperature controller comprises a heater for heating the ink.

14. The system of claim 10 wherein the temperature controller comprises a cooling mechanism for lowering the temperature of the substrate.

15. The system of claim 10 wherein the temperature controller comprises a heater for heating the substrate.

16. The system of claim 10 wherein the temperature controller comprises a cooling mechanism for lowering the temperature of the ink.

17. The system of claim 10 further comprising a video processor for processing the information in the electrical signal.

18. The system of claim 10 further comprising a video memory for storing the information in the electrical signal.

19. The system of claim 10 further comprising a display device for displaying the information in the electrical signal as a visible image.

20. A system for detecting an image formed on a substrate with an invisible ink, comprising, a heater for increasing the temperature of the ink with respect to the substrate, an ink jet printer for applying the ink to the substrate to form an image thereon, an infrared camera for scanning the substrate and outputting an electrical signal corresponding to a temperature image of the scanned applied ink and the substrate.

* * * * *